United States Patent [19]
Whitehead et al.

[11] Patent Number: 6,085,030
[45] Date of Patent: Jul. 4, 2000

[54] NETWORK COMPONENT SERVER

[75] Inventors: W. Robert Whitehead, Sandy; John Darrell Christensen, S. Jordan, both of Utah

[73] Assignee: Novell, Inc., Provo, Utah

[21] Appl. No.: 08/850,078

[22] Filed: May 2, 1997

[51] Int. Cl.[7] ..................................................... G06F 15/16
[52] U.S. Cl. ................................. 395/200.33; 395/200.31
[58] Field of Search ......................... 395/200.31, 200.33, 395/800.28, 200.47, 200.59, 200.49, 62, 683; 707/10, 104

[56] References Cited

U.S. PATENT DOCUMENTS

| | | | |
|---|---|---|---|
| 5,483,652 | 1/1996 | Sudama et al. | 707/10 |
| 5,497,463 | 3/1996 | Stein et al. | 395/200.33 |
| 5,748,896 | 5/1998 | Daly et al. | 395/200.53 |
| 5,761,499 | 6/1998 | Sonderegger | 707/10 |
| 5,802,367 | 9/1998 | Held et al. | 395/685 |
| 5,826,085 | 10/1998 | Bennett et al. | 395/683 |

OTHER PUBLICATIONS

Christensen, John, Net2000 Smart Component Overview, (Net102D) Brainshare Mar. 1996, Novell, Inc., pp. 7–9.
Olsen, Jim, Net2000 Component Infrastructure, (Net205D) Brainshare Mar., 1996, Novell, Inc., pp. 36–38.
Whitehead, Robert, Net2000 Component Architecture, (Net 206D) Brainshare Mar., 1996, Novell, Inc., pp. 42–43.
Whitehead, Robert, "Novell Developer Notes", Novell, Inc., Mar. 1996, pp. 1, 3–11.

*Primary Examiner*—Mehmet B. Geckil
*Attorney, Agent, or Firm*—Cesari and McKenna, LLP

[57] ABSTRACT

A component server architecture is provided that enables consumer nodes of a computer network to interact with heterogeneous software components and services distributed throughout the network, as well as network devices and data. Distributed interaction between a consumer and heterogeneous software is achieved, in part, by registering and locating the components and services (hereafter referred to collectively as components). An object-neutral global component registry with access controls of the architecture interoperates with a component management service (CMS) to transparently ensure proper administration, authentication and run-time binding access to components offered in response to requests from applications executing on the consumer nodes. The architecture is implemented on a component server node of the network that is configured to communicate with the consumer, i.e., client, nodes in client-server computing arrangements. That is, the component registry of the component server node responds to a consumer application request by locating a heterogeneous component for the consumer. The registry offers this component to the consumer by providing an appropriate interface between the object model of the consumer and the object model of the software component. This registry is preferably organized as a plurality of cooperating storage entities including a description repository, an offer repository, an interface adapter repository and an object factory repository.

31 Claims, 9 Drawing Sheets

NETWORK COMPONENT SERVER

CROSS-REFERENCE TO RELATED APPLICATIONS

This invention is related to co-pending U.S. patent application Ser. No. 08/576,647, entitled: Method for Managing Globally Distributed Software Components, filed Dec. 21, 1995.

FIELD OF THE INVENTION

This invention relates generally to computer networks and a system for managing and integrating distributed components which reside on the network. More particularly this invention is directed to a method for locating, registering, and interoperating with heterogeneous network components comprising software objects and services, hardware devices, and data which reside on and execute in a local or wide area network.

BACKGROUND OF THE INVENTION

Modern information technology provides a vast array of software to meet many different needs. However, after a need is identified, the shear volume of available technology and the lack of common architectures make generation and management of custom solutions difficult and expensive. Component software encourages encapsulation and reuse of software routines for decreasing program development and maintenance time. Distributed software systems allow software services, components, and objects to work together over network infrastructures such as Local Area Networks (LAN), Wide Area Networks (WAN), and the Internet. The current software world is littered with existing software systems, heterogeneous hardware platforms and heterogeneous software object models which all contribute to the complexity of distributed software systems.

Software systems which utilize distributed components first require a method to locate services or components on the network. Hardcoding addresses, configuration files, command line parameters, service broadcasting, naming systems, local or distributed repositories are all known methods that are used to locate services and components on the network. A summary of the more common of these conventional locating methods follows.

The Component Object Model (COM) method for locating components utilizes a registry file with a specific format. Non-COM software components cannot be stored in the COM registry. Object Linking and Embedding (OLE)/COM /ActiveX software components are accessible on a given computer only if they are registered in a local registry file. The COM registry file maps software component identifiers known as class identifiers (CLSIDs) to the file system location of a binary object and to type library information about the interface(s) of the server component. This provides a framework to make individual pieces of software available, but it is limited to COM objects and to the software that can access the local registry file.

This reliance on the local registry file unduly limits component availability and creates scaling problems if many computers need access to the registration information. While COM components may be stored on computers that are connected to a LAN and clients of these components may also reside on the LAN, COM does not take full advantage of the capabilities of LAN administration tools. Most often COM assumes its environment will be a single isolated computer. The COM object model enables COM components to interact, but does very little to enable component distribution.

Distributed COM (DCOM) adds remote execution and distributed naming to COM. DCOM locates components using the same mechanisms defined in COM (the location can be supplied by the client in a local Windows registry). In addition DCOM plans to use the NT 5.0 active directory where references to objects are distributed with the naming system. Once DCOM has located a component on the network it issues a remote procedure call to the destination system to access remote objects. DCOM improves upon COM, but DCOM still has limitations in the area of interoperation with heterogeneous object models, and in the use of common LAN administration tools.

Java applets and programs provide another architecture for locating distributed software components. Java applets are miniature programs that are executed while users view Internet information, such as World-Wide-Web pages. Java applets are linked or included in World-Wide-Web pages in a similar manner as images or other data with hard-coded references to an Internet HTTP address. When a user selects a highlighted or underlined portion of a web page that was linked to the Java applet, the Java applet is transferred across the Internet to the user's Web browser where the Java applet is executed. If the browser contains a Java interpreter, the Java applet (comprising Java byte codes) is loaded and executed by a Java Virtual Machine (JVM) embedded within the web browser.

The Java architecture is an improvement over the architecture for the COM model because in addition to the reference and interfaces, the software is also distributed dynamically. Components are hardware independent. However, the link or reference to a Java applet (class) across the Internet is a static physical reference at one moment in time. If the Java applet is moved, the web page cannot find it. In addition, Java applets and COM objects do not work together without custom written browsers and static object wrappers which perform the necessary interface transformations or adaptations.

Also, a Remote Method Invocation (RMI) architecture is included in the Java architecture which allows remoting between Java objects and remote execution of applets, thus creating a distributed object system. The RMI architecture includes a bootstrap registry which is used to locate distributed Java components. Although similar in concept to the local COM registry, the RMI bootstrap registry does not interoperate with objects other than Java objects and cannot store information about components for different object models as was the case for the local COM registry. Neither registry is fully scaleable or distributed across the network, and therefore objects cannot be managed as part of the object distribution system.

Another method for component discovery periodically broadcasts or advertises services across the network. One implementation of this is User Datagram Protocol (UDP) broadcasts in the TCP/IP protocol, while another implementation of this method is Novell's Service Advertisement Protocol (SAP). SAP provides a means for independently locating components (i.e., hard-coding of service location is no longer needed). However, this method consumes a significant amount of network bandwidth and is therefore an undesirable solution to locate components in a global network.

The Common Object Request Broker Architecture (CORBA) defines additional ways to locate components. At its most basic level, CORBA provides an implementation repository (similar to the RMI bootstrap registry or the COM local Windows registry); in addition, CORBA defines a binding service, an interface repository and optional naming and trading services. The trading service maintains a repository of object types and offers. The interface repository for CORBA is a runtime database containing interface definition language (IDL)-defined interfaces, where IDL is the standard language used in CORBA for specifying the interfaces of CORBA objects. Operationally, a provider of a new service on the network registers information about the new service with the implementation repository either directly or indirectly via a naming service or Trader service. Thereafter, a client on the network accesses the implementation repository either directly (static reference to known physical objects), or via naming or trading services which contain a logical representation of the CORBA objects that are available on the network at any point in time. The naming and trading services cross the boundary from physical object references to logical object references. This is an improvement over the COM and Java models for object location.

Specifically, the Trader service assures that the types and interfaces of the provided service matches the service requested by accessing the Trader type repository. The Trader obtains an object reference to the service offer from the trader offer repository which indexes the CORBA implementation repository. The object reference to the service offer is then passed back to the client so that the software objects can bind via the CORBA binding service.

The CORBA object model requires that CORBA be the design center for distributed systems and that all other object models must bridge to it. The CORBA object model addresses the need for interoperation between object models by requiring all non-CORBA objects to wear CORBA wrappers, or "jackets". To a CORBA system, all objects may interoperate as long as they "look" like CORBA objects. Accordingly, CORBA addresses problems associated with scaleability, location independence, and interoperability, by providing implementation repositories, interface repositories, and naming/trader services. However, in CORBA all objects must bridge to CORBA, and CORBA does not take full advantage of the abilities of LAN administration tools.

These conventional methods generally use different standards to create a single software component model and architecture (both hardware and software) known to work together. Yet, these standards do not allow management and integration of heterogeneous components. While integration among and changes to existing systems require significant re-engineering, the flexibility to adopt new technologies wanes as these systems become more complex. This results in conventional systems being "locked into" hardware, programming languages, software object models and distribution frameworks for well-known components and systems having controlled interactions. Within each system, object distribution, discovery, binding and management follow models that are tightly-coupled with a defined object model. Heterogeneity among such different known systems thus requires bridges and custom interfaces.

In summary, conventional component object models define their own independent object-model centric registries and repositories for locating distributed software objects. These registries are not integrated within object models, and they are limited to software objects. Currently, there is no object neutral global component registry with security access control. Also there is no component services registry having a common point of management for distributed components that enable interoperability among these independent registries. Moreover, management of components in a network is problematic because there is no single point of control. This problem becomes even more significant as the network grows in size.

For example, system administrators require the ability to control naming of components so that they can be efficiently located and accessed anywhere on a global network. It is undesirable for administrators and en-dusers to physically install and manage components at every node on the network. Also, component programmers are reluctant to provide access to software components without adequate safeguards that protect unauthorized use of their software. These issues have contributed to the delay in full acceptance of distributed component software.

The present invention addresses these issues and, in particular, is directed to a component server architecture that provides an infrastructure for administering, integrating, exposing and managing distributed heterogeneous components and services. More specifically, the present invention is directed to an architecture that facilitates discovery of, access to and interoperation among various components and software in a distributed system.

Therefore, it is an object of the present invention to provide a system for managing the location, distribution and access of various software, hardware, and data components and component object models distributed in a computer network.

Another object of the invention is to provide a component management system which internally supports various object modeling systems for integration within a directory services provider.

It is yet another object of the present invention to provide such a system which takes advantage of the capabilities of Internet servers.

SUMMARY OF THE INVENTION

The invention comprises a network component server architecture that manages and enables consumer nodes of a computer network to interact with heterogeneous software components, hardware devices, data objects and services distributed throughout the network, as well as network devices and data. Distributed management and interaction between a consumer and heterogeneous objects are achieved, in part, by registering and locating the software components, hardware devices, data objects and services (hereafter referred to collectively as components). According to the present invention, a novel object neutral, global component registry with security access control of the architecture interoperates with a component management service (CMS) to transparently ensure proper administration, authentication and run-time binding access to components offered in response to requests from applications executing on the consumer nodes.

In the illustrative embodiment, the inventive architecture is implemented on a component server node of the network that is configured to communicate with the consumer, i.e., client, nodes in client-server computing arrangements. That is, the component registry CMS of the network component server node responds to a consumer application request by locating a heterogeneous component for the consumer; according to an aspect of the present invention, the global component registry offers this component to the consumer by providing an appropriate interface between the object model of the consumer and the object model of the software component. The novel registry is preferably organized as a plurality of cooperating storage entities including a description repository, an offer repository, an interface adapter repository and an object factory repository.

Specifically, the description repository includes similar functionality to the CORBA trader service type repository along with the additional functionality of object model neutrality, access controls, and an overall integration with all repositories to form a component registry. The offer repository comprises the functionality contained in the CORBA offer repository, the CORBA implementation repository, the Windows registry, the Java bootstrap registry, in addition to object model neutrality and access controls. The interface adapter repository is a superset of the functionality comprised in the CORBA interface repository, and the COM type libraries. The object factory repository contains implementations of components which can be utilized in object instantiation.

The CMS performs an initial look-up function in the description repository to determine whether the requested component is registered with the component registry. The description repository acts as a template describing the set of like components. If the description is found, the request is routed by the CMS to the offer repository where references to specific instances of that component type are registered. Here the registered component instances are examined to determine whether they match the requested component properties. If the instances match, the component reference is passed by the CMS to the requesting component consumer. If the offer repository does not contain the desired component, CMS looks in the object factory repository for implementations of the required component. If an implementation of the component exists the component is instantiated and its reference is passed back to the component consumer. If the new component is not implemented in the object model expected by the component consumer, CMS utilizes the interface adapter repository to manufacture an interface between the object model of the component consumer, and the component's implementation.

Operationally, the CMS selects an appropriate interface specification from the interface adapter repository for implementing the offered component and passes that interface to the CMS. The CMS then provides the binding needed to establish communication between the offered component and requesting application. If different object models are used for these communicating elements, the CMS invokes an interface adapter to transform the offered component model to that of the requesting application.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF THE INVENTION

Figure 1:
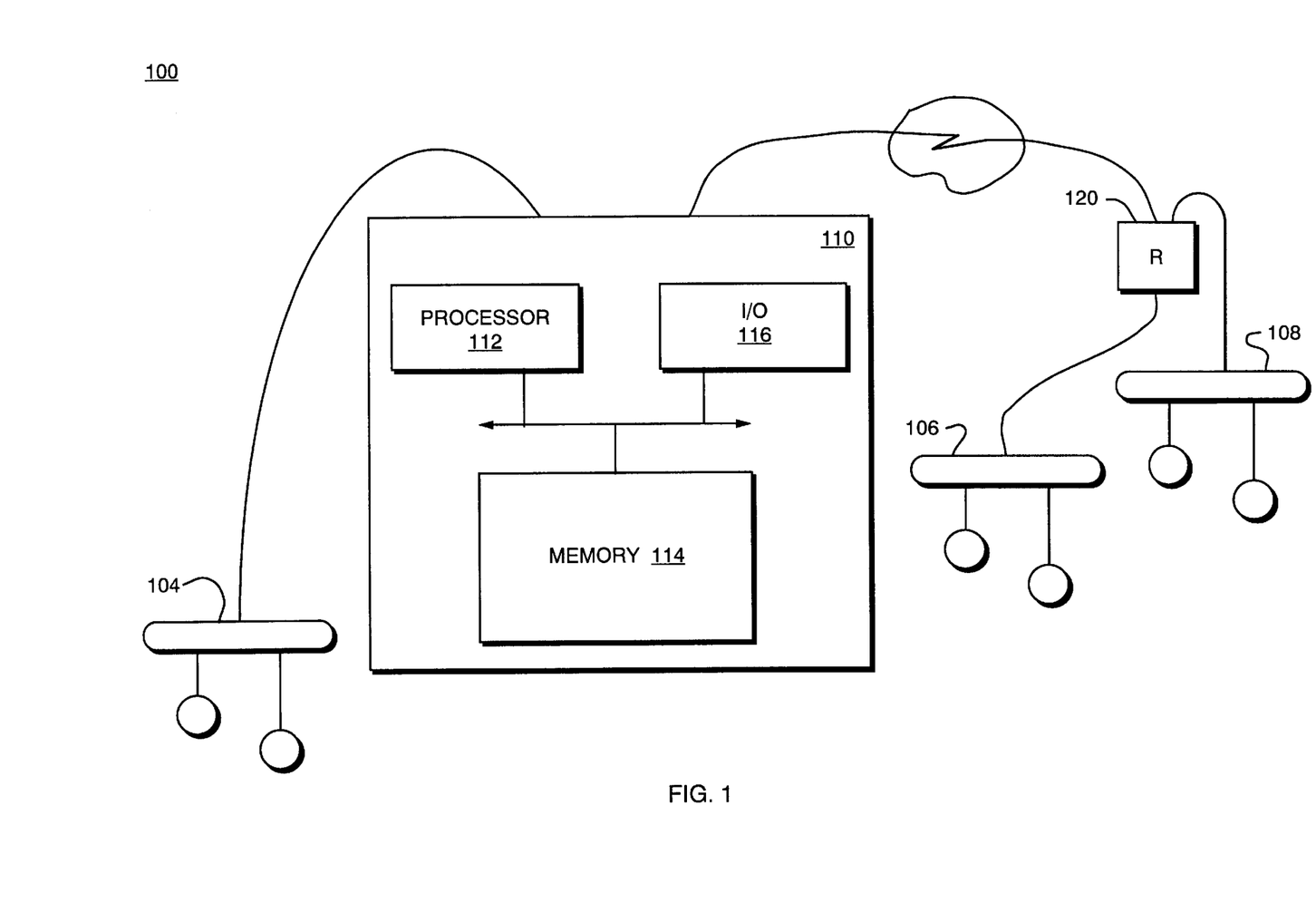
FIG. 1 is an illustration of a network environment for the system used in an embodiment of the present invention.

FIG. 1 is a block diagram of a computer network environment 100 comprising a collection of communication links and subnetworks 104, 106, 108, 110 and 120 connected to a plurality of nodes that may be advantageously used with the component server architecture of the present invention. The nodes are typically computers such as local and/or remote mobile systems embodied as personal computers (PC), laptops, workstations, mainframes, minicomputers, network computers (NC), personal digital assistants (PDA), Java Stations, file servers and/or application servers and network devices. Communication among the nodes is typically effected by exchanging discrete data packets or frames over network signal lines such as twisted pair, coaxial, optical fiber, telephone lines, satellites, microwave, relays, modulated AC powerlines, infrared wireless, or other conventionally known data transmission systems.

Each node generally comprises a plurality of interconnected elements, such as a processor 112, a memory 114 and an input/output (I/O) adapter 116. The memory 114 may comprise storage locations addressable by the processor 112 and I/O adapter 116 for storing software application programs and component data structures associated with the inventive architecture described herein. In addition, the processor 112 may comprise processing elements or logic for executing the application programs and manipulating the software components according to the techniques described herein. An operating system, portions of which are typically resident in memory and executed by the processor, functionally organizes the node by, inter alia, invoking network operations in support of software processes executing on the node. It will be apparent to those skilled in the art that other processor and memory means, including various computer readable media, may be used for storing and executing program instructions pertaining to the described techniques.

The subnetworks may include local area networks (LANs), such as Intranets, and wide area networks (WANs) links, including the Internet. The computer network environment may be configured as a single LAN or multiple permutations of LANs, WANs and the Internet interconnected by hubs, routers, bridges and/or gateways, as appreciated by those skilled in the art. Network protocols executing over the network environment may include IPX/SPX, TCP/IP, AppleTalk and Internet Inter-ORB protocol (IIOP), whereas network operating systems controlling the computer network may include Novell NetWare Version 4.x, VINES, Windows NT and LAN Manager and LANtastic NetWork and UNIX.

The component server architecture of the present invention may be configured to reside on any node having sufficient data storage, network connectivity and processing capability. In the illustrative embodiment, however, the architecture is preferably implemented on a component server node configured to provide services in response to requests from applications executing on client, i.e., consumer, nodes of the network. The component server may comprise a single instance or multiple instantiations configured to operate collectively or independently on a node, while the consumers may reside on any node in the network including the same node as the component server. These consumer nodes may include non-traditional network nodes such as embedded software devices, hardware devices, printers, routers, modems, databases, database objects, stored procedures and network-accessible data and hardware.

Network Component Server Architecture

Figure 2:
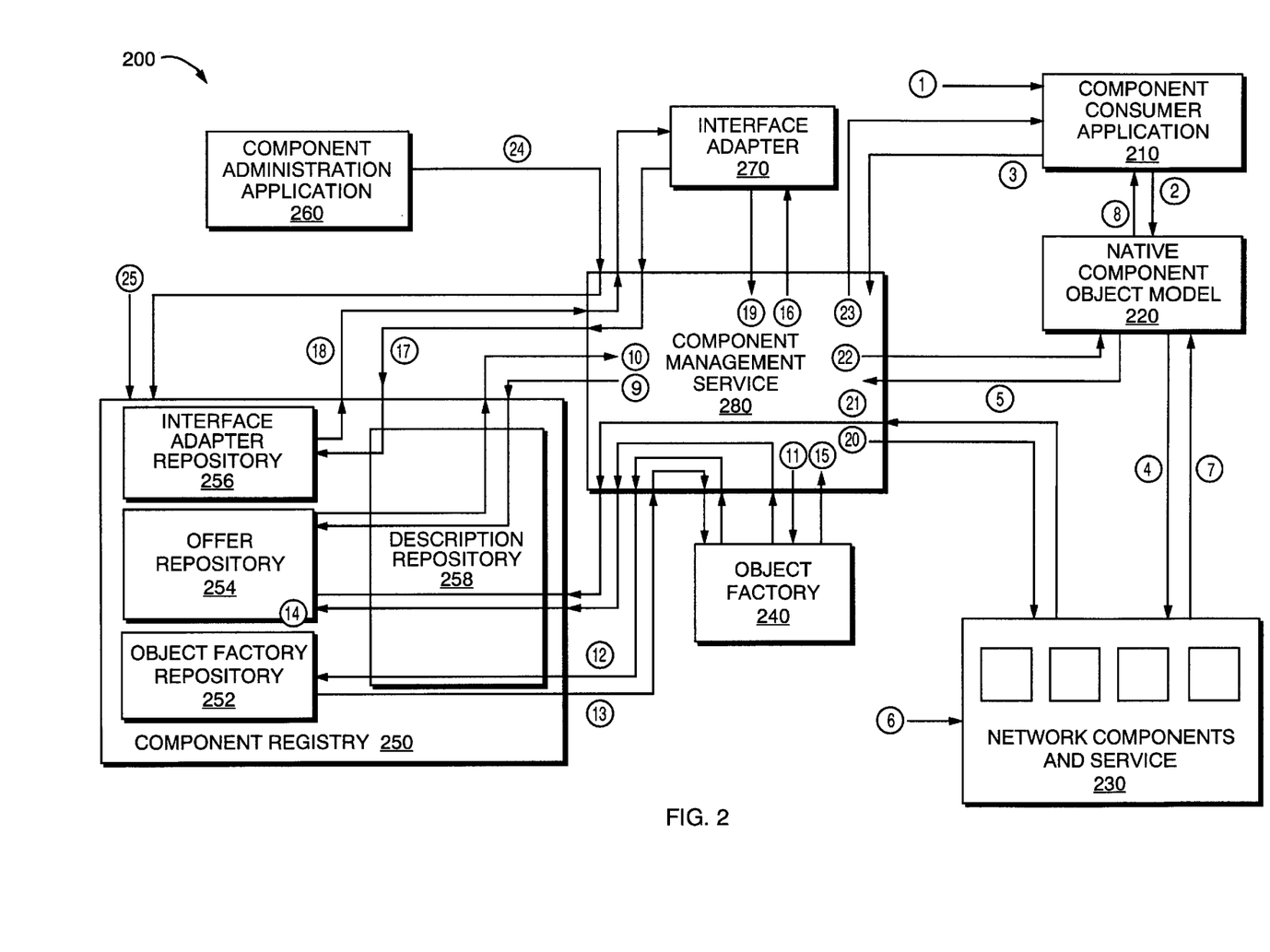
FIG. 2 is a data flow diagram for a system architecture according to an embodiment of the present invention.

According to the invention, the component server architecture described herein provides a framework for enabling distributed interaction between a consumer application and heterogeneous software components and services. That is, the architectural framework enables advertisement and transparent location of components and services (hereinafter referred to collectively as components), along with authentication, distribution, administration and run-time binding of those components to consumers. FIG. 2 is a schematic block diagram showing the interaction between an application 210 executing on a consumer node and various elements of the architecture 200 including a native component object (NCO) model 220, a network components and services (NCS) 230, an object factory 240, a component registry 250, a component administration (CA) application 260, an interface adapter 270 and a component management service (CMS) 280.

The consumer application 210 may include a stand-alone application and applet that requests components for execution either locally or remotely, the latter via conventional remoting technology such as remote procedure calls (RPCs) and RMI, i.e., proxy/skeleton interaction. As indicated by path 1, the consumer application may be started by an end-user, administrator or other component. Requests for components may be issued by the application to the NCO model 220 via path 2 or directly to the CMS 280 via path 3. These latter direct requests allow the application to take full advantage of CMS features such as run-time discovery, dynamic authentication and binding to network components.

If the application 210 is an existing or "Network Component Server-unaware" application, then components are preferably accessed via the NCO model 220 which allows backward compatibility through bind services with the NCS 230. These applications may utilize the CMS 280 transparently through object model redirection (indicated by paths 5, 22 and 8) as discussed further in connection with FIG. 3, although requests received by the NCO model 220 (via path 2) need not be redirected to take advantage of the CMS 280. Applications that bind natively to NCS 230 through paths 4, 7 and 8 use the native component registry of the NCO model 220 for an appropriate object-model. These native services may be started, installed and managed manually via path 6, or they may be instantiated and managed by CMS 280 via path 20. Object binding with the native registry can also be administered indirectly in the component registry 250 and "pushed-out" (or distributed) to native registries through paths 10 and 22.

The component registry 250 interoperates with the CMS 280 to, inter alia, determine how to bind the requesting application with an appropriate component. The component registry 250 may be implemented on any persistent storage mechanism and preferably comprises an object factory repository 252, an offer repository 254, an interface adapter repository 256 and a description repository 258. In the illustrative embodiment, the component registry 250 is based upon NetWare directory services (NDS) although other directory service technology may be used to supply such a global component registry infrastructure; examples of these alternative technologies include LDAP or X.500 compliant naming systems, ODBC/JDBC compliant databases such as ORACLE or SYBASE, flat file databases or memory resident repositories.

Component requests to the network component server may be redirected to the CMS 280 via paths 5 and 22 or called directly via paths 3 and 23. Both types of requests are handled similarly by the CMS 280. Specifically, the CMS 280 first checks the component registry 250 (via paths 9 and 10) to determine if the requested component is available in the offer repository 254. If the component is available, binding information is returned to the requesting consumer application 210 via paths 22 or 23. If the component is not available, the request is forwarded to the object factory 240 via path 11 to activate an object corresponding to the requested component.

In response to the request, the object factory 240 checks the object factory repository 252 (via paths 12 and 13) to determine if the requested component implementation exists. If so, the object factory 240 "starts" the requested component as described with reference to FIG. 5. If successful, the object factory 240 registers a new instantiation of the requested component with the offer repository 254 via path 14. The object factory 240 returns a newly registered offer reference for the requested component to the CMS 280 via path 15. Or alternatively, the requested component registers itself via path 21. In either case the object factory 240 returns a newly registered offer reference for the requested component to the CMS 280 via path 15.

At this point, CMS 280 determines whether the offer reference obtained from the object factory 240 (via paths 11 and 15) or from the offer repository 254 (via paths 9 and 10) matches the object model requested by the consumer application 210 (via paths 3 and 5). If the object models of the offer or implementation match the NCO model 220 of the requesting application, the object reference is returned via paths 22 and 23; otherwise, the interface adapter repository 270 is used to bridge the object models via paths 16 and 19, as described further with reference to FIG. 6. Briefly, the interface adapter 270 sends a request to the interface adapter repository 256 (over paths 17 and 18 of CMS 280) to build an appropriate interface between the offered component and the object model of the requesting application. As a result, an offer is returned to the requesting application (via paths 22 and 23) that resembles a native component.

The CA application 260 uses an interface provided via path 24 to configure the CMS 280 and to manage information stored in the component registry 250. The registry 250 may further be administered by native administration programs associated with the architecture and used to implement the registry (via path 25). For example in the illustrative embodiment based on NDS, NWAdmin (i.e., a program used to administer NDS) may be utilized to administer the component registry 250. Administration of components will be discussed in more detail with reference to FIG. 7.

Native Object Model Redirection

The component server architecture provides redirection processes that allow existing components to interact with the CMS without requiring rewrite of the components' software. Moreover, these processes enable software developers to write components to a single familiar object model using familiar tools, programming languages and interfaces that require little or no knowledge of the component server. Through redirection, legacy applications can be exposed as components and managed transparently.

Figure 3:
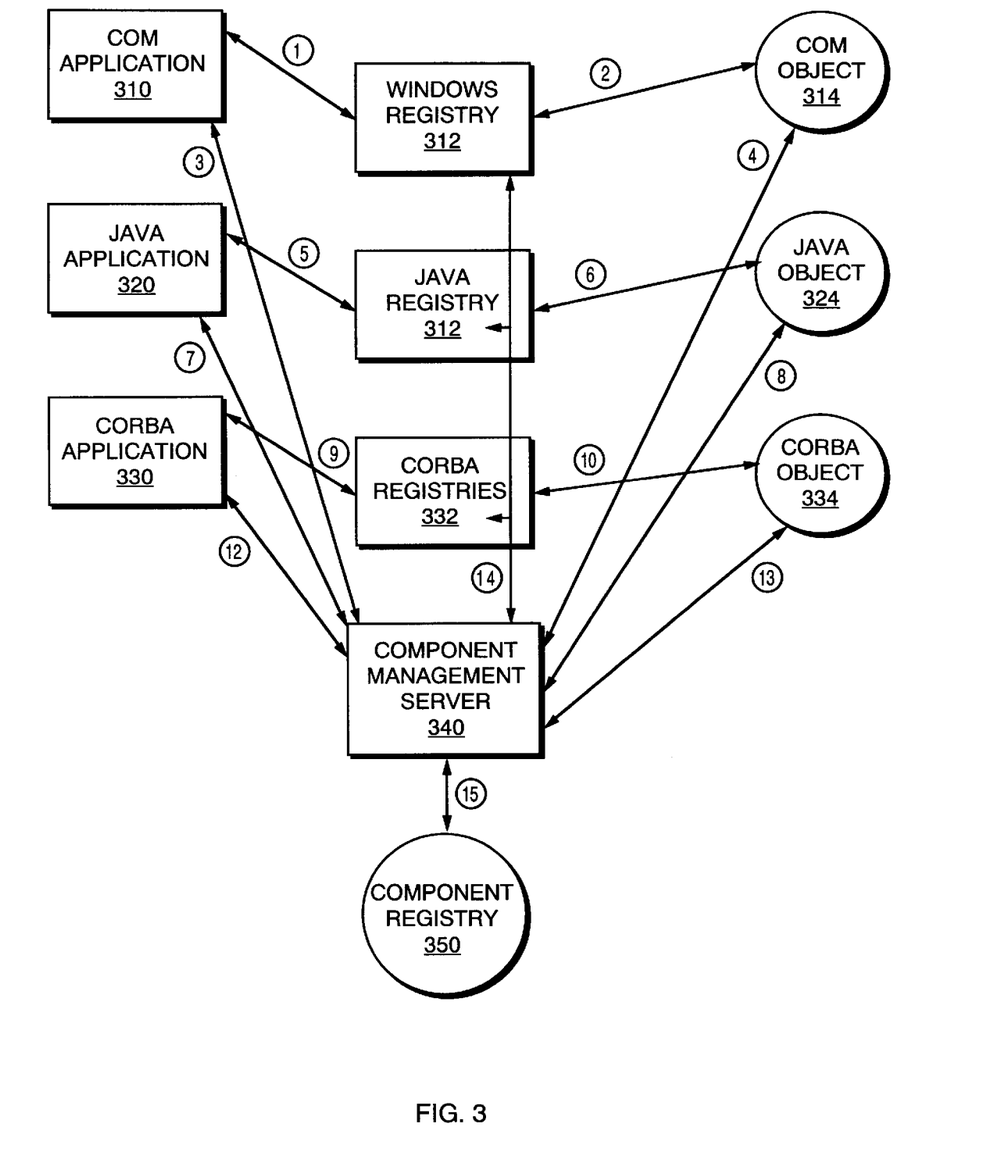
FIG. 3 illustrates component model redirection according to an embodiment of the present invention.

Native object model redirection is preferably accomplished in two ways: (i) through interception of and adding functionality to existing programming interfaces, and (ii) through populating or redistributing information from the component registry to native object model registries. Examples of redirected component models include COM, Java RMI and CORBA. FIG. 3 illustrates redirection of native component object models to the CMS for an embodiment of the present invention including the COM, Java RMI and CORBA component models.

COM applications 310 typically request component information from a Windows registry 312 by issuing COM application programming interface (API) function calls, such as CoCreateInstance and CoGetClassObject, via path 1. In response to these COM functions, the Windows registry 312 loads the requested component locally or remotely binds to the requested COM object via path 2. In accordance with the invention, the CMS 340 "redirects" the COM object model by intercepting the CoCreateInstance and CoGetClassObject function calls (path 3), and thereafter passing queries to the component registry over path 15 rather than to the local Windows registry 312. CMS 340 and the component registry 350 then cooperate to bind the request to the required component.

Similarly, Java objects 324 and CORBA objects 334 are accessible to the COM applications 310 via the CMS 340. Specifically, CMS 340 intercepts the COM API calls by replacing OLE32.DLL (contained in the Windows system folder) with a "CMS-aware" DLL that provides new entry points for the CoCreate Instance and CoGetClassObject calls. Entry points for other COM calls are passed through to the OLE32.DLL. CMS 340 is preferably used in the COM model to store and download DLLs, store file-map references to components and store components as binaries in the component registry 350 with location transparency.

Java applications 320 that request loading of additional Java classes or applets (via path 5) typically employ a Java class loader to locate (either locally or via static HTTP web addresses) the required Java component objects 324 from a bootstrap Java RMI registry 322. The Java application request may be re-directed to the component registry 350 by extending the Java class loader to access the CMS 340 (via path 7) for binding to the requested object component (via path 8). COM objects 314 and CORBA objects 334 are likewise accessible to the Java applications 320 via CMS 340 over paths 4 and 13. As with the COM model, CMS 340 is used in the Java model to store and download Java Classes and applets, store file-map and HTTP references to components and to store components as binaries in the component registry with location transparency.

CORBA applications 330 typically request CORBA objects 334 by way of a CORBA registry (or Trader service) 332 (via paths 9 and 10). To take advantage of global management capabilities, requests from the CORBA applications 330 may be redirected to the CMS 340 via path 12. Standard CORBA bind methods can be extended by redirection to the CMS 340 to locate the requested CORBA objects 334. Moreover, Java objects 324 and COM objects 314 are accessible to CORBA applications 330 via CMS 340 over paths 4 and 8.

The second method for redirection of native component models involves management of component information in the CMS 340 and redistribution of this information to native object model registries (such as the Windows registry 312, the Java registry 322 and the CORBA registry 332). This method of redirection allows administrators to install components only once and "push" them out to local registries for consumption by native object models. This method also allows caching of components from a central implementation repository (such as the component registry 350) to local repositories for mobile computing.

Global Component Registry

Figure 4A:
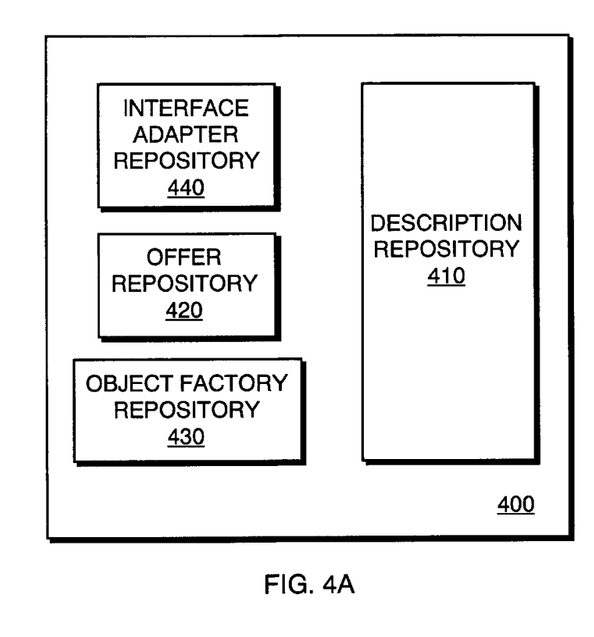
FIGS. 4A and 4B illustrate a component registry implemented according to an embodiment of the present invention.

In accordance with the inventive architecture described herein, the global component registry interoperates with the CMS to transparently ensure proper administration, authentication and run-time binding access to components offered in response to requests from applications executing on the consumer nodes. FIG. 4A is a block diagram of the component registry. In a preferred embodiment of the invention, the component registry 400 is implemented using NDS, although alternative embodiments may utilize other naming systems (e.g., COS Naming, X.500 directories, LDAP, XFN, Cairo), databases (e.g., ODBC/JDBC compliant, SQL, ORACLE, SYBASE), flat files and memory resident repositories that, in general, do not offer the range of functionality provided by NDS.

The component registry 400 is the single point of information for routing of all software component requests from consumers of the network. According to an aspect of the present invention, the registry 400 is used by CMS to respond to such requests by offering components through appropriate interfaces between the object models of the consumers and of the software components. To that end, the novel global registry is preferably organized as a plurality of cooperating storage entities including a description repository, an offer repository, an interface adapter repository and an object factory repository.

The description repository 410 ensures consistent interfaces, properties, versions and implementations between components so that all instances of a component type are guaranteed to share the same characteristics. The description repository 410 essentially functions as an initial look up to determine whether the type of the requested component is part of, i.e., registered with, the description repository 410. If the type of the requested component is found in this repository 410, the request is directed to the offer repository 420 where specific instances of that component type are registered. Here, the registered component instances are examined to determine whether they match the requested component and, if so, the object factory repository 430 is accessed.

However, if the type of the requested component is not found in the description repository 410, an indication will be issued to the user that no components exist which correspond to the requested component. Also, if the requested component does not match any of the component instances, the object factory (as discussed in connection with FIG. 2) is accessed to register the offer reference for the requested component.

The object factory repository 430 is a persistent storage of implementations for the components registered in the offer repository; this repository provides the specific object implementation for the offered component. Finally, the appropriate interface is invoked from the interface adapter repository 440 to allow communication between the requesting application and component object implementation. The interface adapter repository 440 is a superset of interface specifications for desired object models which describe a means for accessing the offered component.

It is noted that the description repository 410 is logically part of the component registry 400, but may be physically separate from the offer repository 420, object factory repository 430 and the interface adapter repository 440 so that multiple CMS servers may share common component definitions. Separation of the description repository 410 from the other repositories of the component registry 400 also allows application of "thick grained", one-step administration functions. In the preferred embodiment, administration functions such as access control list manipulation can be applied to a given component type in the description repository 410 and then the operation may be replicated by NDS to all interfaces, offers and implementations of the component type in the entire network.

Figure 4B:
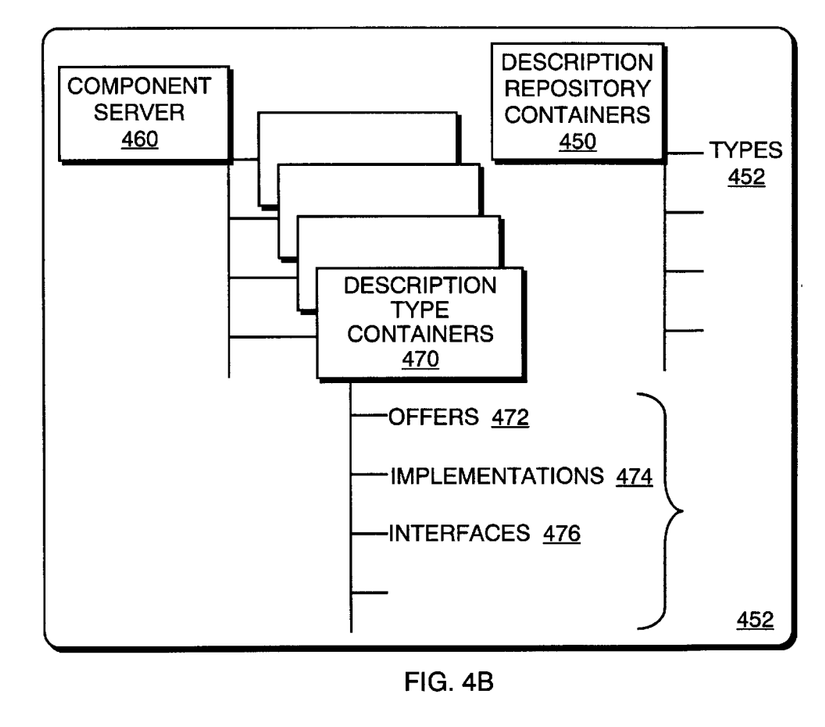

The physical implementation of the component registry 400 is preferably accomplished by modifying the NDS schema to define attributes and relationships between objects in NDS. The NDS schema may be further modified to allow representation of multiple component servers and type repositories at any node in the NDS tree. In the illustrative embodiment, three additional NDS container objects and four new NDS leaf objects are added to the NDS schema as illustrated in FIG. 4B. The container objects include a description repository container 450, a component server container 460 and a description container 470, whereas the leaf objects include type objects 452, offer objects 472, implementation objects 474 and interface objects 476.

The description repository containers 450 only contain type objects 452. The type objects 452 define required CMS properties of any offers of the named type. Additional attributes and properties may be added to the CMS type objects and the description repository container 450 to specify configuration information and persistent data for the description repository 410. The component server containers 460 hold a desired number of the description type containers 470 which aid in the administration, look-up and organization of implementations and offers. The component server containers 460 also have additional attributes and properties to specify configuration information and persistent data for the named component server.

The description type containers 470 have NDS associations with actual type objects in the description repository 410. The description type containers 470 may contain any combination of other description containers, offer objects 472, implementation objects 474, and interface objects 476. NDS access controls (by an individual user or by a group) may be set on individual and combinations of objects and containers for the schema of the component registry 400.

The component server objects added to the NDS Schema and added to the NDS tree inherit all of the functionality implemented in NDS and the NDS administration applications because they are all "first-class" NDS objects. NDS features that add value to the CMS include: replication, security, single sign-on authentication, access control lists, licensing and scaleability. Alternative embodiments of the invention where the component registry 400 is not based upon NDS are limited in functionality in direct proportion to the availability of these NDS features. FIG. 4B contains one of many possible schema layout implementations and the present invention is not limited to the layout shown in this figure.

Component Instantiation

Figure 5:
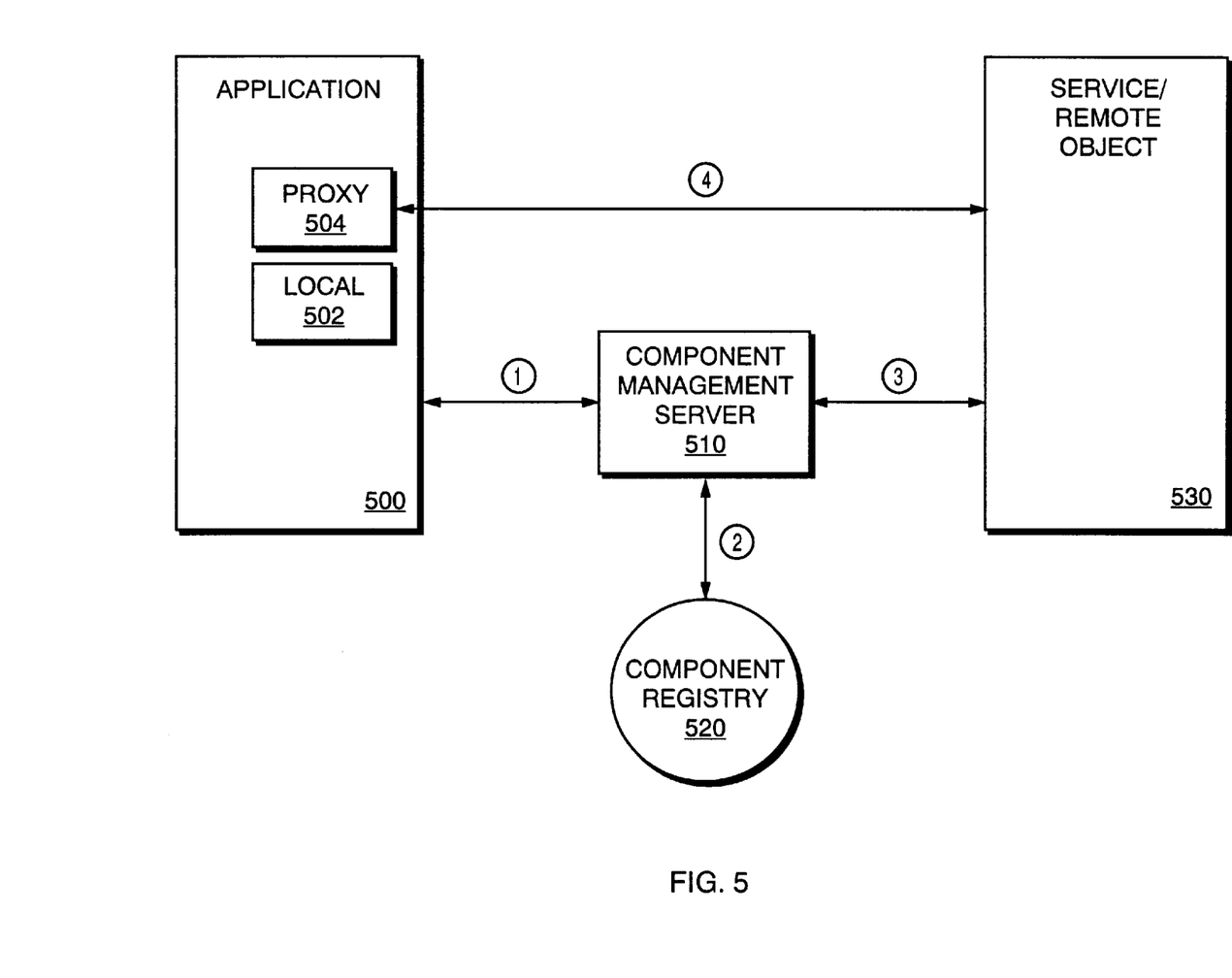
FIG. 5 illustrates a component instantiation according to an embodiment of the present invention.

In accordance with the present invention, the instantiation of components in a distributed network is aided by the interaction between the inventive CMS and component registry. As illustrated in FIG. 5, an application 500 sends a request for a component to the CMS 510 via path 1. The component management system supports both local and remote instantiation of components. Local instantiation 502 involves downloading and execution of the actual component on the same platform as the application whether in the same process, a separate thread, or a separate process. Remote instantiation 504 involves loading a proxy object on the local machine, starting the service on a remote node of the network 530 via path 3, and binding the remote service to the local proxy object via path 4 after the component registry 520 provides the appropriate component to the requested application via path 2.

The CMS 510 also may speed system through-put by caching components. This caching may involve serialization of components out to disk to save state and restore when needed. For instance, just-in-time (JIT) compiled Java byte-codes are saved for future requests for a specific Java class. Dynamically generated component interfaces (via interface bridging) are saved for future references. The CMS 510 can also be used to cache network components to a local storage to aid in mobile computing where the network is used to down-load applications, and components when the network connection is available. When the network connection goes away, the cached or down-loaded components are available for execution.

Load balancing is also accomplished by the CMS 510. As requests for services are received, real-time decisions can be made and administrative policies can be enforced to limit the number of connections to given services, and to maximize utilization of the CPU. Multiple hardware servers can be populated with services as requests are received.

If services are started on a remote machine, the capability to spawn processes on a given remote machine is required. Some operating systems such as NetWare allow remote start-up of executables. Other systems require a resident application on the remote machine (such as the inet daemon on Unix) which listens for requests and actually starts applications as requested.

Component Object Model Bridging

The present invention further provides information in a global component registry to enable interface bridging between different component object models. The CMS infrastructure provides information to enable static object model bridging, where hard-coded (program implementation time) interfaces or wrapper code is part of the component implementation. Dynamic generation of object bridges requires that a super-set of interface information be stored in the interface adapter repository of the component registry. This information includes IDL definitions in the case of CORBA, unknown interface information in the case of OLE/COM and an intermediate object-neutral interface representation to enable other object model bridging.

Figure 6:
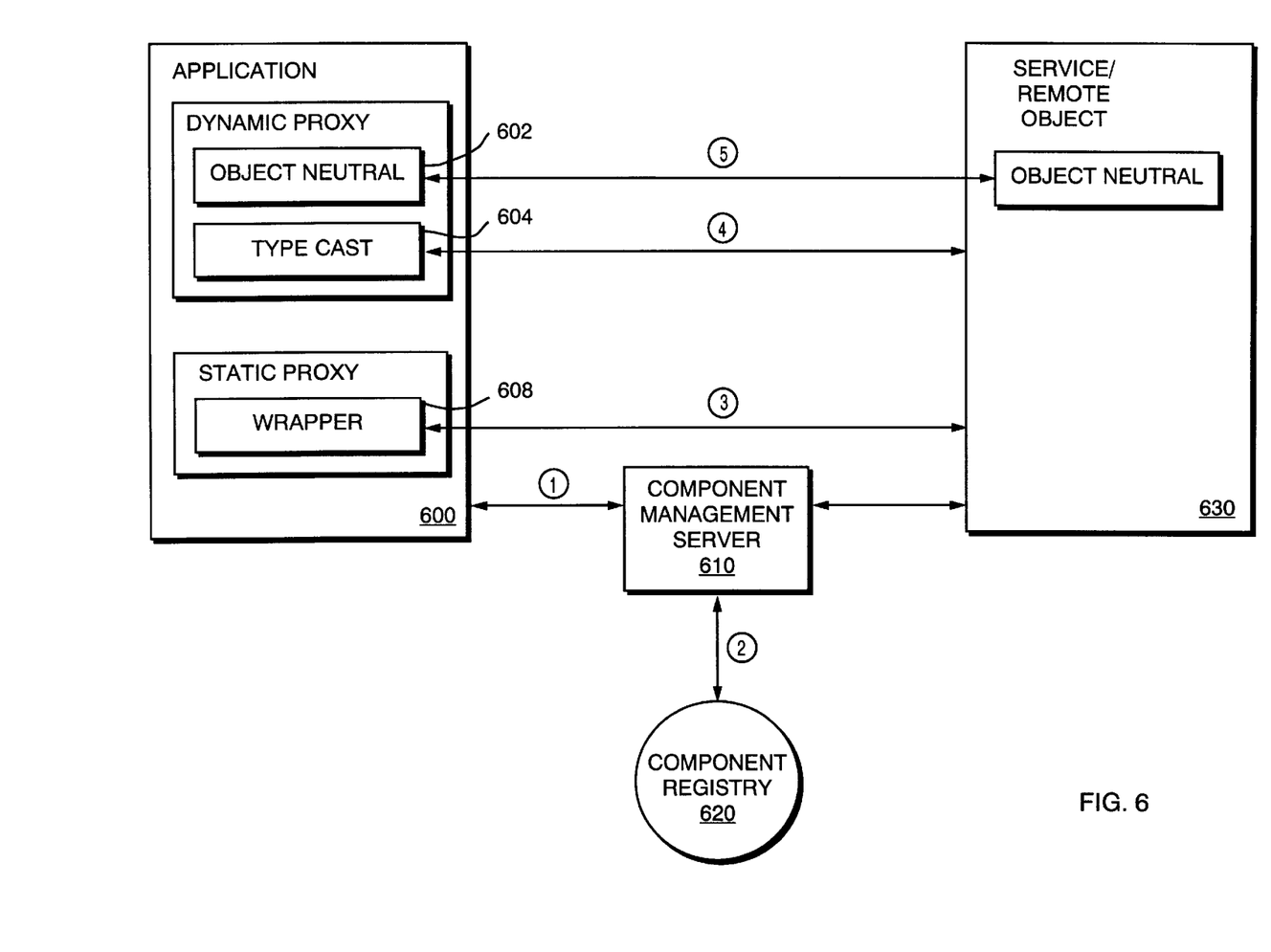
FIG. 6 illustrates component object model bridging according to an embodiment of the present invention.

In FIG. 6, an embodiment of the present invention is illustrated for an application 600 that makes a request to the CMS 610 for a service or a remote object 630 via path 1. The component registry 620 then provides the appropriate component to the requested application via path 2. If a static wrapper implementation exists for the object model of the application, a static proxy code is supplied to the application. The proxy code generates a wrapper object 608 for providing a one-to-one bridge via path 3 that is both transparent to the consuming application and is created statically at component design time. If no object model bridge exists, the CMS 610 uses information in the interface adapter repository of the component registry 620 to build proxy code which binds with the remote object or service 630. This method is slower than the object-wrapper approach, but it is more flexible in that it provides various object bridges (i.e., bridging from many object-models to many-object models).

For simple and common data types, a dynamic proxy generated by the CMS 610 may use type casting 604 to directly map data types between object systems via path 4. For more complex data types, the dynamic proxy generated by the CMS 610 may require a two step transformation from the native object type, to an object-neutral intermediate representation 602, and then to the desired object system representation via path 5. This method pays more performance penalty, but is more flexible in that only one object model mapping is required for each object system to the intermediate representation and that the method is bi-directional. The interface adapting capabilities of the CMS 610 then can bridge between any object model which bridges to the intermediate representation.

Component Authentication

An important feature provided for distributed object system in accordance with the CMS of the present invention is the capability to associate access control information with components in the distributed network. The inventive CMS allows control over who owns interfaces, implementations, and offers, as well as who has the right to find, use or modify those objects. This capability is an enabling feature for allowing fine-grained control over the distribution, maintenance, versioning, licensing, metering, administration, and access to globally-distributed software.

In the preferred embodiment, an NDS identity can be used to associate any operation with a user because the CMS is used as the look-up and binding point of control. Stated another way, the CMS uses NDS to provide user authentication and client identity. The CMS can control who provides components and services by specifying who can add to the object factory and offer repositories of the component registry. The CMS can control which users or groups of users have access to see components, and who has the privilege or license to use the components. The CMS also controls when the binding operation begins and identifies the component or service consumer. As a result, a software metering capability may be enabled to license software components on a per-use basis.

Figure 7:
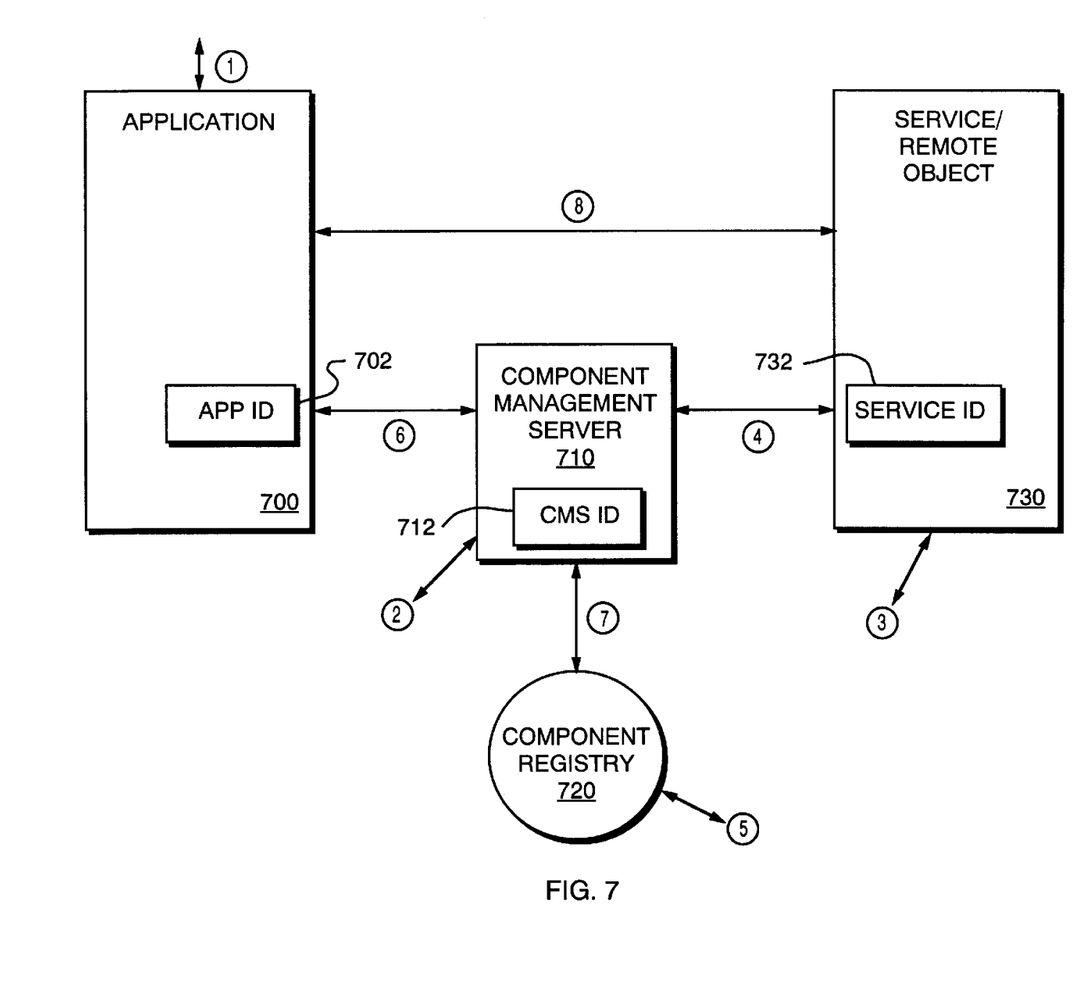
FIG. 7 illustrates authentication of components by the CMS according to an embodiment of the present invention.

FIG. 7 illustrates a component authentication according to an embodiment of the present invention where an application 700 which has an application identity established during a login operation via path 1. The CMS 710 has a CMS identity 712 which is established during initiation of the CMS via path 2. A remote service 730 has an associated identity obtained either during the manual start-up of the service via path 3 or that is inherited from the CMS 710 via path 4 when the service is started. Access controls are set in the component registry 720 via path 5 by standard NDS administration utilities. These identities are utilized throughout the start-up, registration, lookup, and binding operations. When the CMS 710 is initiated, it must have the proper CMS ID 712 to access the component repository 720. Services-must have the proper ID in order to register and advertise themselves through the CMS 720. Applications must have the proper AppID 702 to lookup offers in the CMS 710 via path 6, and to request binding to the offers of the remote service 730 via path 8. The management of these access controls and the authenticated IDs of the CMS 710 are all provided by the component registry 720 via path 7 which uses NDS for these features in the preferred embodiment.

Alternative embodiments of the present invention may be utilized where the implementation of the component registry 720 relies upon technology other than NDS to provide authentication and access control.

Component Administration

Figure 8A:
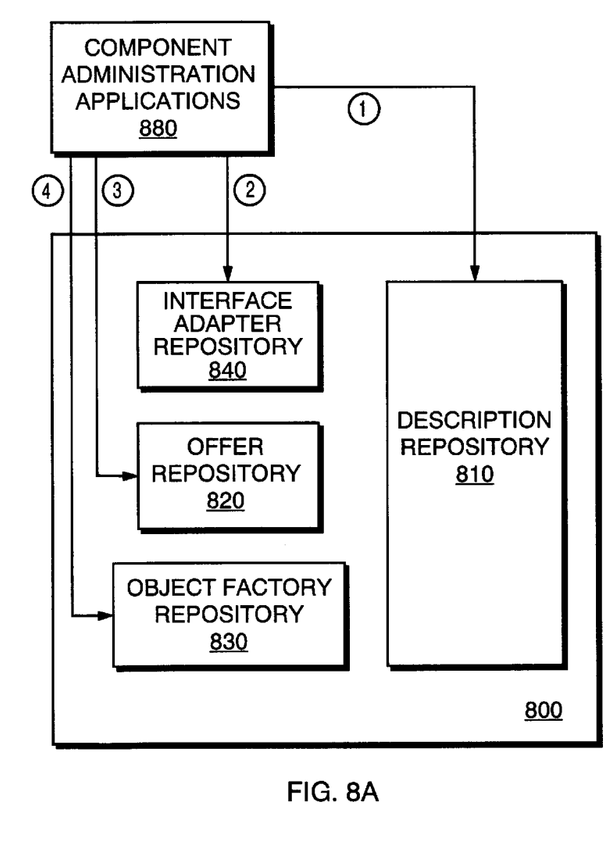
FIGS. 8A and 8B illustrate the administration of the CMS according to an embodiment of the present invention.

The present invention further provides unique and novel component administration capabilities. In particular, as illustrated in FIG. 8A, interfaces between CA applications 880 and a description repository 810 via path 1, an interface adapter repository 840 via path 2, an offer repository 820 via path 3, and an object factory repository 830 via path 4 of a component registry 800 are provided. In a preferred embodiment, NDS administration applications and NDS Access controls are utilized so that an administrator has fine grained (down to the individual user and individual offer) access control over individual components. The administrator also has wide-grained control of the system, (up to operations on whole types of components, complete groups and organizations, and complete Component Management Servers).

Figure 8B:
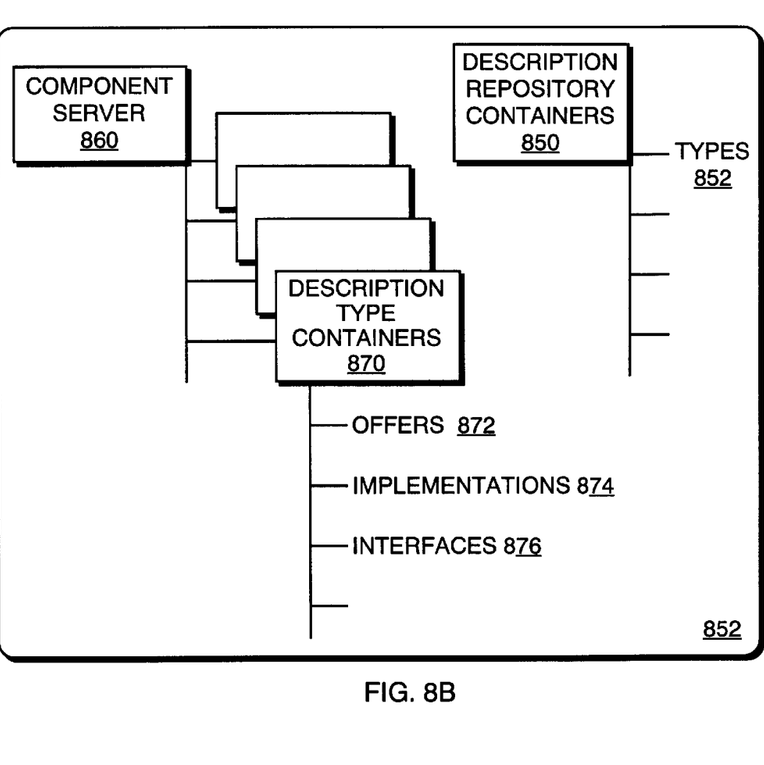

As illustrated in FIG. 8B, administrators can browse the component server tree 860 for description type containers 870, and associated offer components 872, implementation components 874, and interface components 876 of the description type containers 870. Also, administrators can browse description repository containers 850 for individual offer types 852. Entries in the NDS hierarchy can be added, deleted, modified, moved via drag-n-drop operations and standard NDS ADMin interfaces. NDS licensing information can additionally be associated with the components.

Component Replication

Figure 9:
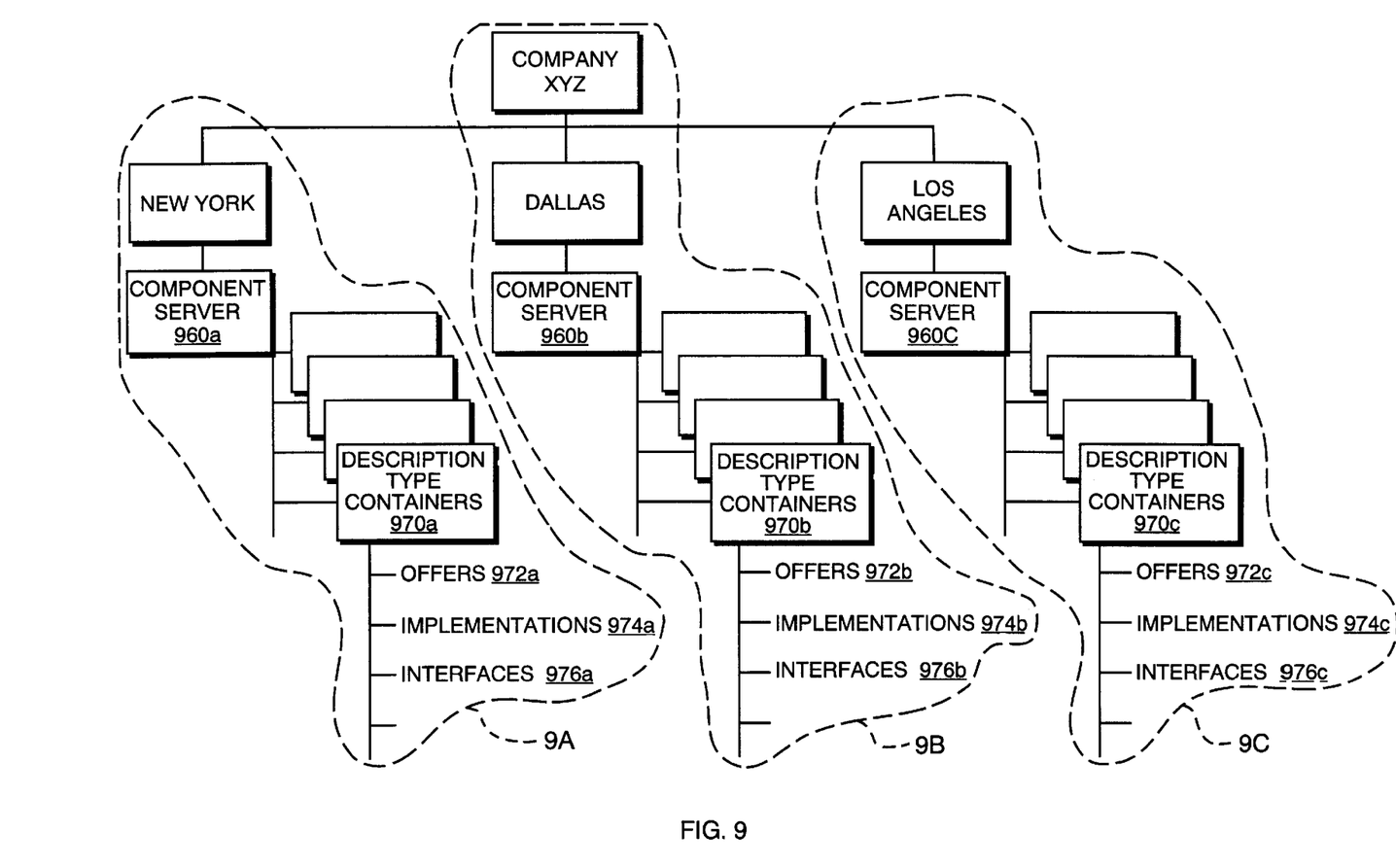
FIG. 9 illustrates the distribution and replication of components by the CMS according to an embodiment of the invention.

The CMS of the present invention also advantageously utilizes component replication features. In the preferred embodiment, NDS replication may be utilized to enhance the distribution of CMS objects. For instance, an NDS tree with three replicated partitions an exemplary company XYZ includes partition for New York (9A), Dallas (9B), and LA (9C). As objects are added to and deleted from individual partitions, NDS loosely replicates the information throughout the entire company XYZ. If a new service implementation is added to the component server in the New York 9A partition for example, this service is replicated transparently across the company to the other partitions in Dallas 9B and LA 9C by NDS replication. As a result, a distribution mechanism for administrators is realized.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A component server for integrating, exposing and managing distributed components residing on a computer network, comprising:

a component management service for controlling requests for distributed components and services; and a component registry for accessing registered components and services in response to requests from said component management service, said component registry including, a description repository for performing an initial look up function based on the type of the request, an offer repository for receiving the request when the component type is located in said description repository and having instances of components stored therein, an instance of said components being accessed when the instance matches the request, an object factory repository having implementations of the components registered in said offer repository stored therein, an implementation being invoked corresponding to the component instance accessed by said offer repository, and an interface adapter repository for storing interface specifications for the implementations stored in said object factory repository, an interface specification being passed to said component management service for the invoked implementation;

said component management service providing the necessary binding between the requested and offered components.

2. A component server according to claim 1, wherein said component management service comprises software for managing the components and services across a plurality of object models, hardware devices, network devices and types of information.

3. A component server according to claim 1, wherein said component registry comprises information for registered components and services so that said component management service may globally register, discover and bind offered components and services to requested components and services which are registered in said component registry.

4. A component server according to claim 1, wherein said component management service further controls authenticated access for registering, discovering and binding of offered components and services.

5. A component server according to claim 1, wherein said component management service further provides a single point of control for managing hardware and embedded devices that discovers and binds requested components and services based on security access controls.

6. A component server according to claim 1, wherein said component management service further provides a single point of control for managing information that discovers and binds requested components and services based on security access controls.

7. A component server according to claim 1, wherein said component management service further provides a single point of control for distributing components and services.

8. A component server according to claim 1, wherein said component management service further provides a single point of control for licensing components and services.

9. A component server according to claim 1, wherein said component management service further provides a single point of control for re-directing requested components and services.

10. A component server according to claim 1, wherein said component management service further provides a single point of control for bridging object models of requested components and services.

11. A component server according to claim 1, wherein the component registry and the component management service operate with CORBA, COM and Java RMI standards for component infrastructures.

12. A component server according to claim 1, wherein the framework for said component registry is based upon NetWare Directory Services (NDS).

13. A component server according to claim 12, wherein NDS provides authentication, replication, distribution, and management for the offered and requested components.

14. A component server according to claim 12, wherein NDS provides a persistent storage and security access control for said component registry.

15. A component server according to claim 1, wherein the framework for said component registry is based upon LDAP, flat file, or ODBC/JDBC databases.

16. A component server according to claim 1, wherein said component management service comprises an interface adapter for transforming the offered component to interface with the requested component.

17. A component server according to claim 1, wherein said component registry functions as a central repository for caching of components and services to local registries for the requested components and services.

18. A component server according to claim 17, wherein said central repository permits mobile computing by the requested components and services.

19. A component server according to claim 1, wherein said component management service performs load balancing for the requested components and services.

20. A system for integrating, exposing and managing distributed components residing on a computer network, comprising:
    managing means for controlling requests for distributed components; and
    registry means for accessing registered components in response to requests from said managing means, said registry means including,
        first means for performing an initial look up function based on the type of the request,
        second means for receiving the request when the component type is located in said first means and having instances of components stored therein, an instance of said components being accessed when the instance matches the request,
        third means having implementations of the components registered in said second means stored therein, an implementation being invoked corresponding to the component instance accessed by said second means, and
        fourth means for storing interface specifications for the implementations stored in said third means, an interface specification being passed to said managing means for the invoked implementation;
    said managing means providing the necessary binding between the requested and offered components.

21. A system according to claim 20, wherein said managing means comprises software for managing the components across a plurality of object models, hardware devices, network devices and types of information.

22. A system according to claim 20, wherein said registry means comprises information for registered components so that said managing means may globally register, discover and bind offered components to requested components which are registered in said registry means.

23. A system according to claim 20, wherein said managing means further controls authenticated access for registering, discovering and binding of offered components.

24. A system according to claim 20, wherein the framework for said registry means is based upon NetWare Directory Services (NDS).

25. A system according to claim 20, wherein said managing means comprises adapting means for transforming the offered component to interface with the requested component.

26. A method for integrating, exposing and managing distributed components residing on a computer network, comprising the steps of:
    (a) controlling requests for distributed components;
    (b) accessing registered components in response to requests from said step (a), said step (b) including the steps of,
        (i) performing an initial look up function based on the type of the request,
        (ii) receiving the request when the component type is located at said step (i) and having instances of components stored therein, an instance of said components being accessed when the instance matches the request,
        (iii) invoking a registered implementation corresponding to the component instance accessed at said step (ii), and
        (iv) storing interface specifications for the registered implementations, an interface specification being passed to said step (a) for the invoked implementation; and (c) providing the necessary binding between the requested and offered components.

27. A method according to claim 26, wherein said step (a) comprises the step of controlling authenticated access for registering, discovering and binding of offered components.

28. A method according to claim 26, wherein said step (a) comprises the step of transforming the offered component to interface with the requested component.

29. A computer readable medium containing executable program instructions for integrating, exposing and managing distributed components residing on a computer network, the executable program instructions comprising the program instructions for:
  (a) controlling requests for distributed components;
  (b) accessing registered components in response to requests from said step (a), said step (b) including the steps of,
   (i) performing an initial look up function based on the type of the request;
   (ii) receiving the request when the component type is located at said step (i) and having instances of components stored therein, an instance of said components being accessed when the instance matches the request;
   (iii) invoking a registered implementation corresponding to the component instance accessed at said step (ii), and
   (iv) storing interface specifications for the registered implementations, an interface specification being passed to said step (a) for the invoked implementation; and
  (c) providing the necessary binding between the requested and offered components.

30. A computer readable medium according to claim 29, wherein said step (a) comprises the program instruction for controlling authenticated access for registering, discovering and binding of offered components.

31. A computer readable medium according to claim 29, wherein said step (a) comprises program instruction for transforming the offered component to interface with the requested component.

* * * * *